United States Patent Office 3,528,319
Patented Sept. 15, 1970

3,528,319
PERFECTLY BALANCED VIBRATIONLESS ROTATION - RECIPROCATION DEVICE OF CRANKSHAFT PLANETARY MOTION SYSTEM
Kenjiro Ishida, Hamamatsu, Japan, assignor to President Shizuoka University
Filed Jan. 15, 1969, Ser. No. 791,436
Claims priority, application Japan, Jan. 30, 1968, 43/5,634, 43/5,638
Int. Cl. G05g 21/00
U.S. Cl. 74—603      4 Claims

ABSTRACT OF THE DISCLOSURE

Perfectly balanced rotation-reciprocation device having a planetary rotating and revolving crankshaft, an eccentric means rotating in reverse direction and at the same uniform angular velocity to the crankshaft and a linearly reciprocating rod. The crankshaft and the eccentric means each provides balance weight to theoretically balance the caused unbalance forces.

---

Figure 1:
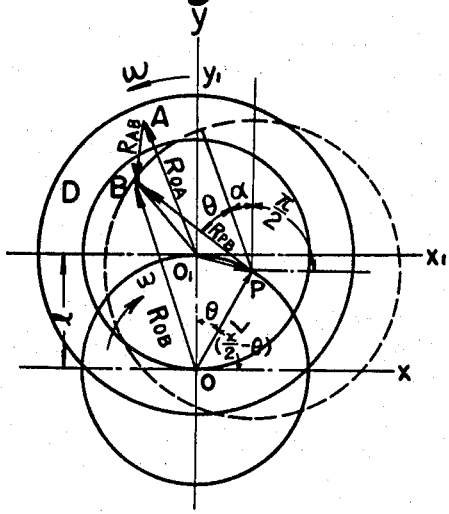

The present invention relates to a rotation-reciprocation device and more particularly to perfectly balanced reciprocating machines or machine parts combined by reciprocating motion and uniform speed circular motion.

Known piston-crank device or rotation to reciprocating device such as internal combustion engine inevitably accompanies vibration as the unbalanced forces caused by inertia of reciprocating mass such as piston and connecting rod cannot be balanced theoretically. The vibration causes known hazards as number of revolution or torque increases.

The primary object of the present invention is to eliminate such disadvantages and to provide a perfectly balanced vibrationless rotation-reciprocation device which theoretically eliminates unbalance force of the reciprocating mass which have been assumed inevitable to such kind of devices heretofore.

In order to attain above-mentioned object, the perfectly balanced rotation-reciprocation device, according to the present invention, has its feature to comprise a casing, a rod having working means at one end, a crankshaft having a crank pin rotatably supporting another end of the rod at an amount of eccentricity $l$, at least one eccentric collar means rotatably supported by the casing and means rotatably supporting said crankshaft at the amount of eccentricity $l$, means to cooperate said crankshaft and said eccentric collar means to rotate the crankshaft and the eccentric collar means at the same uniform angular velocity and in the reverse direction each other to effect linear reciprocating motion of the rod, balance weight means of mass $m_1$ secured to the crankshaft directly in the opposite side of the crank pin about axis P at distance $R_1$ from the center of crankshaft, another balance weight means of mass $m_2$ secured to the eccentric collar means directly in the opposite side of the support means about axis O at distance $R_2$ from its center, and the both balance weight means are determined to satisfy formulae $ml=m_1R_1$ and $(m+m_1+m_3)l=m_2R_2$, wherein $m$ being reciprocating mass, $m_3$ being rotating mass, so that unbalance forces caused by reciprocating mass are balanced perfectly.

As mentioned above, the rotation-reciprocation device according to the present invention provides a linearly reciprocating rod, a planetary rotating and revolving crankshaft and at least one eccentric collar means rotating in the reverse direction and at the same angular velocity to the crankshaft. This device further comprises balance weight means according to the present invention, as will be explained more fully hereinafter, which theoretically balances all unbalance forces.

The vibration amplitude characteristic of the rotation-reciprocation device according to the present invention is in the order of $3\mu$ at 5000 r.p.m. of crankshaft which is about 1/80 to conventional crank and rod device.

Further, as the rod to connect piston or work component performs linear reciprocating motion, the rod receives only compression load and no bending moment acting to the rod, also no side pressure is applied to the cylinder.

The above-mentioned features of the perfectly balanced vibrationless rotation-reciprocation device according to the present invention can be utilized in many applications as prime movers such as internal combustion engines or hot gas engines and also as working machines or mechanisms driven by other input power source. Some of the applications will be mentioned below.

At first the vibrationless feature can advantageously be utilized as machines which are not to be mounted on rigid foundation. Such applications include portable gasoline engines for many uses such as chain saw, mower, branch cutter or sprayer; and also soft foundation engines for vehicles such as boats, motorcycles, automobiles, aeroplanes or lawn mowers.

The feature of the vibrationless linearly reciprocating rod can be advantageously utilized as prime movers and working machines. As prime movers, both sides of the piston can be utilized as double acting engine or underside of the piston can be utilized as pre-compression space for intake of gas mixture or air especially for 2-cycle engine. As compressors, double acting or 2 stage compressor can easily be attained. Further, the connecting rod can be divided to insert spring means for accommodating torque variation or to insert adjustable means to vary compression ratio.

The linear reciprocating feature also can be utilized as working machines or mechanisms driven by other input source. Such applications include needle bar mechanism for sewing machine, reciprocating mechanism for spinning and weaving machine, spring expansion mechanism for spring testing machine, reciprocating mechanism for machine tool, riveter, chisels, or hammers.

Figure 2:
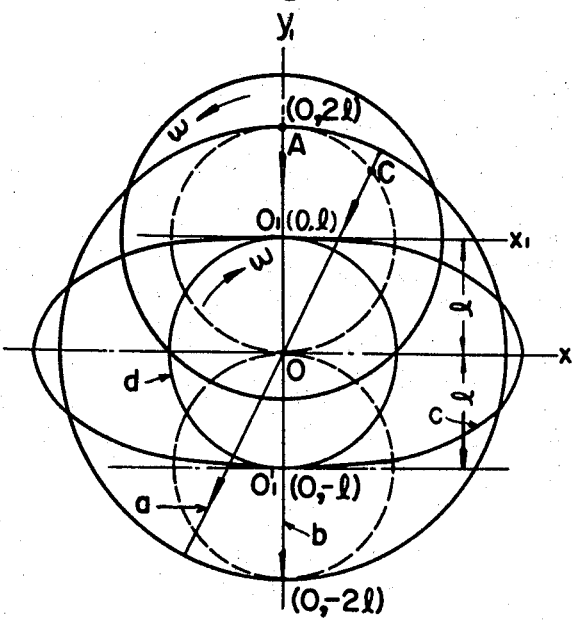
Figure 3:
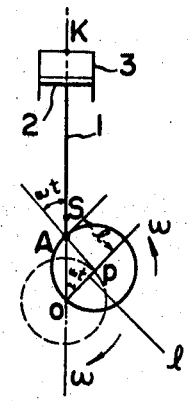
Figure 4:
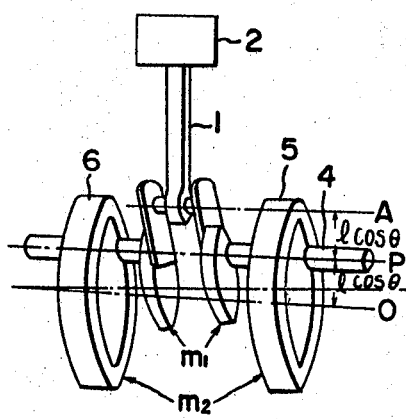
Figure 5:
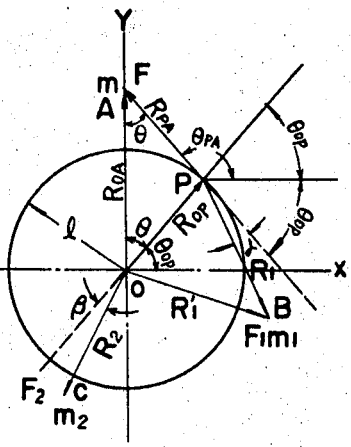
Figure 6:
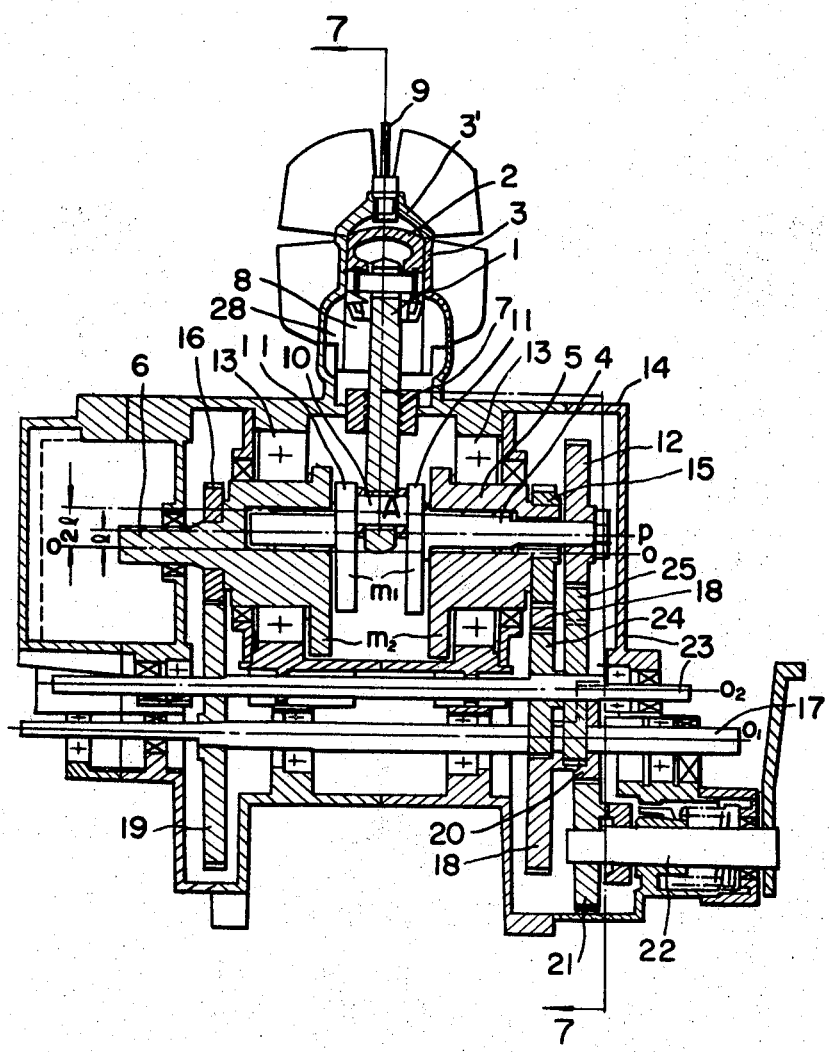
Figure 7:
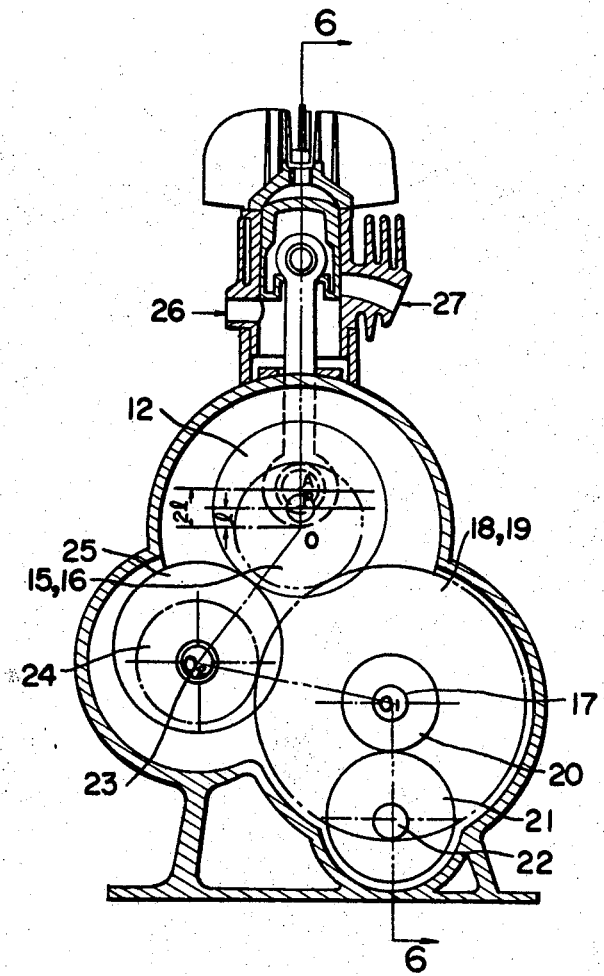
Figure 8:
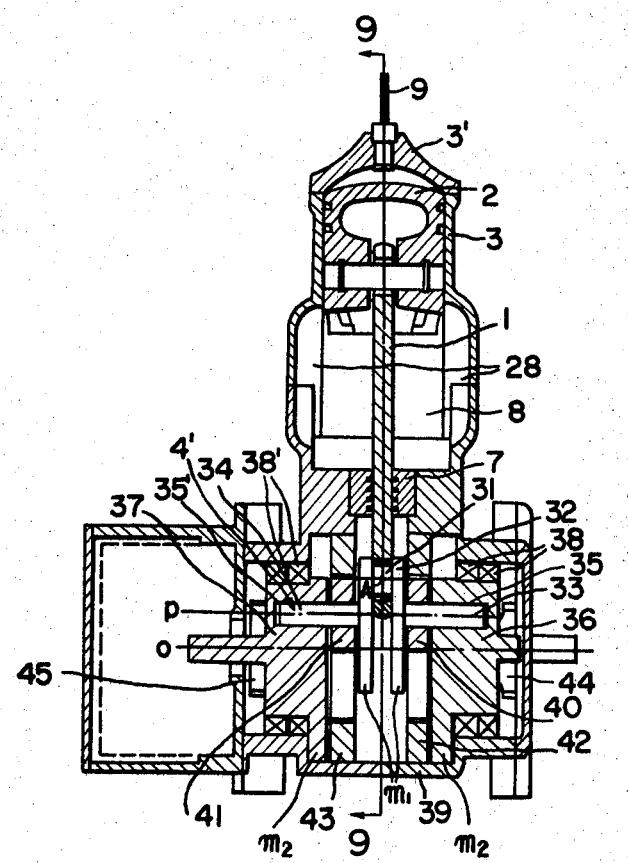
Figure 9:
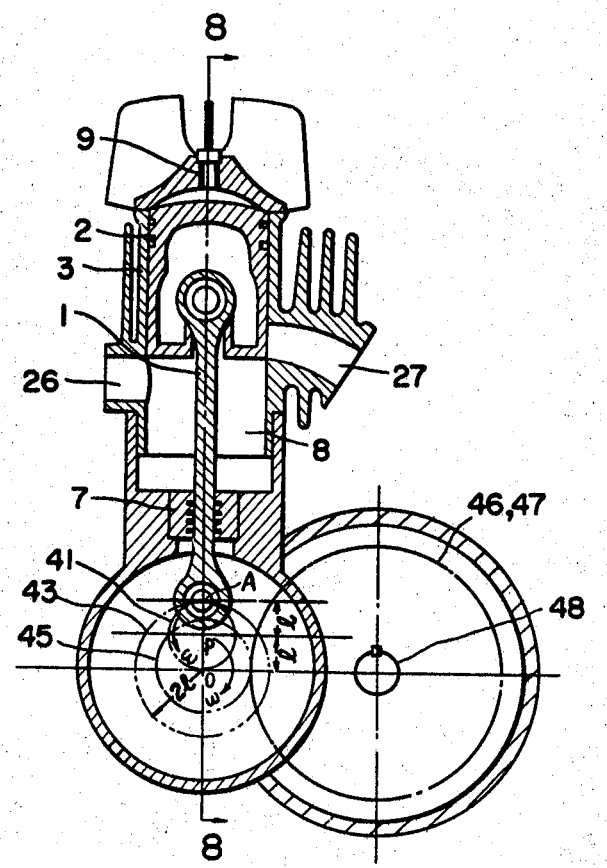

Principles, mechanisms, features and advantages of the present invention will become apparent in the following detailed description referring to the accompanying drawing, in which:

FIG. 1 shows a vector diagram of a point A on a disc D performing rotation and revolution of the same angular velocity $\omega$ in the reverse direction at the same time, FIG. 2 shows locus diagrams of specific points on the disc D, FIG. 3 shows a diagrammatic illustration of rotation-reciprocation device according to the invention, FIG. 4 shows principle of perfect balance of a piston-crank mechanism according to the invention, FIG. 5 shows a vector diagram of points A, P and O shown in FIG. 4, FIG. 6 shows a longitudinal sectional view of a 2-cycle reciprocating engine embodying perfectly balanced rotation-reciprocation device having a planetary rotating and revolving crankshaft according to the invention, FIG. 7 shows a diagrammatic elevational view along line 7—7 of FIG. 6, FIG. 8 shows a longitudinal sectional view of the second embodiment of the present invention, and FIG. 9 shows an elevation along generally line 9—9 of FIG. 8.

At first, theoretical analysis of basic principle about generation of linear reciprocating motion by combining two uniform speed circular motions will be explained.

As shown in FIG. 1, a disc D rotates on its axis $O_1$ at angular velocity $\omega$, and at the same time the point $O_1$ revolves on center O at distance $l$ at angular velocity $\omega$ in the reverse direction with the disc. The motion of point A on the disc D is mathematically analyzed.

When:

$O_1$—axis of the disc D at initial position
P—axis of the disc D after $t$ second angle of revolution of axis $O_1$ in $t$ second at angular velocity $\omega$ about axis O
A—a point on the disc D
B—position of point A after $t$ second
$r$—distance between the axis $O_1$ and the point A
$l$—distance between axis $O_1$ and center O (amount of eccentricity)
L—vector showing position of axis P from axis O
$R_{OA}$—vector showing position of point A from axis $O_1$
$R_{AB}$—vector showing position of point B from point A
$R_{PB}$—vector showing position of point B from axis P
$R_{OB}$—vector showing position of point B from center O and, arguments of the position vectors are shown in FIG. 1.

The motion of the point A on the disc is shown in next formula.

$$R_{OB} = l \sin\theta - r \sin(\theta+\alpha) + i\{l\cos\theta + r\cos(\theta+\alpha)\} \quad (1)$$

then:

$$|R_{OB}| = R_{OB} = \sqrt{l^2 + r^2 + 2lr\cos(2\theta+\alpha)} \quad (2)$$

Equation 2 is differentiated by time, $$\dot{R}_{OB} = -4lr\dot\theta \sin(2\theta+\alpha) \quad (3)$$

When Formula 3 is zero, $R_{OB}$ is constant and circular motion is performed; then, $$lr = 0, \therefore r = 0 \quad (4)$$

When point $O_1$ performs circular motion, the velocity and acceleration thereof are as follows:

$$r = 0 \text{ then } R_{OB} = le^{i\left(\frac{\pi}{2}-\theta\right)}$$

$$V = \dot{R}_{OB} = -il\dot\theta e^{i\left(\frac{\pi}{2}-\theta\right)}$$

$$a = \ddot{R}_{OB} = l\dot\theta^2 e^{i\left(\frac{\pi}{2}-\theta\right)} \quad (5)$$

From Formula 1, argument of $R_{OB}$ is given as follows:

$$\tan W = \{l\cos\theta + r\cos(\theta+\alpha)\}/\{l\sin\theta - r\sin(\theta+\alpha)\} \quad (6)$$

When argument W is constant, $\overrightarrow{OB}$ is linear motion, then, first stage partial differential of $\tan W$ by time:

$$\frac{\delta \tan W}{\delta t} = \frac{-l^2\dot\theta + r^2\dot\theta}{\{l\sin\theta - r\sin(\theta+\alpha)\}^2} \quad (7)$$

$$\frac{\delta \tan W}{\delta t} = 0 \therefore l = r$$

Thus, every point at radius $r$ from the point $O_1$ performs linear reciprocating motion of stroke $4l$.

FIG. 2 shows loci of several points of the above case. The point A (O, $2l$) in FIG. 2 performs linear reciprocating motion of stroke $4l$ along line $b$; and further loci are, line $a$ is locus of point C, ellipse $c$ is locus of point $O_1'$ (O, $-l$), and circle $d$ is locus of point $O_1$ (O, $l$).

FIG. 3 shows a diagrammatic illustration of a piston crank mechanism performing linear reciprocating motion of the connecting rod. In FIG. 3, K shows upper dead center, S shows lower dead center, P shows center of rotation of the crankshaft, and O shows center of revolution of the crankshaft. The rotation and revolution are in the reverse direction with each other by the same angular velocity $\omega$; distance between the centers O and P is $l$. In this embodiment, connecting rod 1 performs linear reciprocating motion with working component such as a piston 2 in a cylinder 3, and the stroke, i.e., distance KS, is $4l$. When the piston 2 is driving member, the linear motion of the connecting rod 1 is transmitted through combination of two uniform speed circular motions to revolution of a shaft about axis O.

Theoretical analysis of basic principle of perfect balance of the above described motion, according to the present invention, will be described hereinafter.

In FIG. 4, crankshaft 4 rotates on axis P at angular velocity $\omega$ and the axis P revolves on axis O in the reverse direction, so that the crankshaft 4 is supported by eccentric collars 5 and 6 rotating on axis O in the reverse direction to the crankshaft 4. The crankshaft 4 carries ballance weight $$m_1 = \left(\frac{W_1}{g}\right)$$

for rotation, and eccentric collars 5 and 6 carry balance weight $$m_2 = \left(\frac{W_2}{g}\right)$$

for revolution.

The vectors showing positions of portions of the mechanism shown in FIG. 4 are shown in FIG. 5, in which:

O—center of revolution of the crankshaft
P—center of rotation of the crankshaft
A—position of crank pin
B—center of gravity of balance weight for rotation
C—center of gravity of balance weight for revolution
$m$—reciprocating mass
$m_1$—balance mass for rotation
$m_2$—balance mass for revolution
$m_3$—rotating mass (rotating mass of rotating portion except equivalent reciprocating mass and balance mass)
$l$—distance between center C and axis P
$R_{OP}$—vector showing position of axis P from center O
$R_{OA}$—vector showing position of point A from center O
$R_1$—vector showing position of point B from axis P
$R_1'$—vector showing position of point B from center O
$R_2$—vector showing position of point C from center O;

and further arguments of the position vectors are shown in FIG. 5.

Balance of forces are described. Inertia force F produced by reciprocating mass $m$ is obtained as follows:

$$R_{OA} = R_{OP} + R_{PA} = l(e^{i\theta_{OP}} + e^{i\theta_{PA}}) \quad (8)$$

$$\therefore F = -m\ddot{R}_{OA} = -ml(-\dot\theta_{OP}^2 e^{i\theta_{OP}} - \dot\theta_{PA}^2 e^{i\theta_{PA}})$$

$$= iml\dot\theta^2 e^{-i\theta} + iml\dot\theta_{PA}^2 e^{i\theta} \quad (9)$$

Similarly, inertia force $F_1$ produced by mass $m_1$ is obtained $$R_1' = R_{OP} + R_1 = le^{i\theta_{OP}} + R_1 e^{-i(\theta_{OP}+\alpha)} \quad (10)$$

$$\therefore F_1 = -m_1\ddot{R}_1' = -m_1\left\{-l\dot\theta_{OP}^2 e^{i\left(\frac{\pi}{2}-\theta\right)} - R_1\dot\theta_{OP}^2 e^{i\left(\frac{\pi}{2}-\theta+\alpha\right)}\right\}$$

$$= im_1 l\dot\theta_{OP}^2 e^{-i\theta} - im_1 R_1 \dot\theta_{OP}^2 e^{i\theta} e^{-i\alpha} \quad (11)$$

Similarly, inertia force $F_2$ produced by balance mass $m_2$ is obtained $$R_2 = R_2 e^{-i\left(\frac{\pi}{2}+\theta-\beta\right)} \quad (12)$$

$$\therefore F_2 = -m_2\ddot{R}_2 = -im_2 R_2 \dot\theta^2 e^{i\beta} e^{-i\theta} \quad (13)$$

Similarly, inertia force $F_3$ produced by rotating mass $m_3$ is obtained $$R_{OP} = le^{i\theta_{OP}} \tag{14}$$

$$\therefore F_3 = -m_3 \ddot{R}_{OP} = -m_3 l(-\dot\theta_{OP}^2 e^{i\theta_{OP}})$$

$$= im_3 l\dot\theta_{OP}^2 e^{-i\theta} \tag{15}$$

For balanced condition, resultant force must be zero, thereby, $$F+F_1+F_2+F_3 = iml\dot\theta^2 e^{-i\theta} + iml\dot\theta_{PA}^2 e^{i\theta} + im_1 l\dot\theta_{OP}^2 e^{-i\theta}$$
$$- im_1 R_1 \dot\theta_{OP}^2 e^{i\theta} e^{-i\alpha} - im_2 R_2 \dot\theta^2 e^{i\theta} e^{-i\theta} + im_3 l\dot\theta_{OP}^2 e^{-i\theta} \tag{16}$$

when, $$\dot\theta_{OP} = \dot\theta = \dot\theta_{PA} \neq 0, \text{ and } \alpha = \beta = 0$$

$$i\omega^2 e^{i\theta}(ml - m_1 R_1) + i\omega^2 e^{-i\theta}(ml + m_1 l - m_2 R_2 + m_3 l) = 0 \tag{17}$$

Formula 17 is to be independent to $\theta$, then, $$i\omega^2 e^{i\theta}(ml - m_1 R_1) = 0$$

and $$i\omega^2 e^{-i\theta}(ml + m_1 l - m_2 R_2 + m_3 l) = 0 \tag{18}$$

Thus;

$$ml = m_1 R_1 \text{ and } (m + m_1 + m_3)l = m_2 R_2 \tag{19}$$

Consequently, when $l$, $m$, $m_1$, $R_1$, $m_2$, $m_3$, and $R_2$ is determined to satisfy Formula 19 when $\alpha = \beta = 0$, the forces are balanced independent to angle $\theta$.

Other condition to attain perfect balance is balance of moment by forces.

Moment $M_p$ by inertia force about axis P is as follows:

$$M_P = F \times R_{PA} + F_1 \times R_1 + F_2 \times (R_{OP} + R_2)$$

$$= ml\dot\theta_{OP}^2 \sin 2\theta + m_1 l R_1 \dot\theta_{OP}^2 \sin(2\theta - \pi - \alpha)$$
$$+ m_2 R_2 l\dot\theta^2 \sin(\pi - \beta) \tag{20}$$

from $ml = m_1 R_1$ and $\alpha = \beta = 0$, $$M_P = ml^2 \dot\theta_{OP}^2 \sin 2\theta - m_1 R_1 l\dot\theta_{OP}^2 \sin 2\theta$$

$$= \sin 2\theta \cdot \dot\theta_{OP}^2 l(ml - m_1 R_1) = 0 \tag{21}$$

Thus, no unbalance force by moment of inertia force about axis P is produced.

Similarly, moment $Mo$ about revolution center 0 is as follows:

$$Mo = F \times R_{OA} + F_1 \times (R_{OP} + R_1) + F_2 \times R_2 + F_3 \times R_{OP}$$

$$= F \times (R_{OP} + R_{PA}) + F_1 \times (R_{OP} + R_1) + F_2 \times R_2$$
$$+ F_3 \times R_{OP}$$

$$= ml^2 \dot\theta_{PA}^2 \sin(-2\theta) + ml^2 \dot\theta_{OP}^2 \sin 2\theta + m_1 R_1 l\dot\theta_{OP}^2 \sin(\pi - 2\theta + \alpha) + m_1 R_1 l\dot\theta_{OP}^2 \sin(2\theta - \pi - \alpha) \tag{22}$$

as, $\alpha = \beta = 0$, and $\dot\theta_{OP}^2 = \dot\theta_{PA}^2$ $$Mo = -ml^2 \dot\theta_{PA}^2 \sin 2\theta + ml^2 \dot\theta_{OP}^2 \sin 2\theta + m_1 R_1 l\dot\theta_{OP}^2 \sin 2\theta$$

$$- m R_1 l \dot\theta_{OP}^2 \sin 2\theta = 0 \tag{23}$$

Thus, no unbalance force by moment of inertia force about revolution center O is produced.

Consequently, in the rotation-reciprocation mechanism shown in FIGS. 4 and 5, when $\alpha = \beta = 0$, and $l$, $m$, $m_1$, $R_1$, $m_2$, $m_3$, and $R_2$ are determined to satisfy the Formula 19, perfect balance can be attained without unbalance force by inertia force and moment of inertia force.

As basic principles of linear reciprocating motion by combination of two uniform speed circular motions and perfect balance of the device according to the invention are shown, two embodiments of reciprocating machine providing the perfectly balanced rotation-reciprocation device will be described hereinafter.

FIGS. 6 and 7 show 2-cycle reciprocating engine providing eccentric gear mechanism. While this is used as an example to describe the invention, it will be understood that the invention has applications to almost all reciprocating machines or mechanisms to attain reciprocating motion by rotating motive power such as compressors, riveters, chisels or reciprocating cutters, and to attain rotating motion by reciprocating motive power such as 2-cycle or 4-cycle gasoline or diesel engines.

As shown in FIG. 6, the linearly reciprocating rod 1 providing working components as the piston 2 which is slidably coupled to the cylinder 3, is connected at the lower end to the crankshaft 4 which is rotatably supported by the eccentric collars 5 and 6. These portions are schematically shown in FIG. 4 and the same reference numerals are used for the sake of clarity.

A seal 7 is secured to the casing 14 to slidably engage the linearly reciprocating rod 1 to define an enclosed chamber 8 in the cylinder 3 between the seal 7 and the piston 2, as will more clearly be described hereinafter. The cylinder 3 comprises a spark plug 9 in the cylinder head portion 3'.

The rod 1 is supported by a crank pin 10 which is secured to crank arms 11 of the crankshaft 4. On the outer end of the crankshaft 4 a spur gear 12 is fixed. The eccentric collars 5 and 6 are rotatably supported by bearings 13 respectively which are secured to a casing 14. On the outer end portions of the collars 5 and 6, spur gears 15 and 16 are fixed respectively.

An output shaft 17 is rotatably supported by the casing 14 as shown also in FIG. 7, and spur gears 18 and 19 meshing with the gears 15 and 16 respectively and a gear 20 meshing with a gear 21 which is secured to a kick starting shaft 22 which is rotatably supported by the casing 14.

A shaft 23 is also rotatably supported by the casing 14, and a gear 24 meshing with the gear 18 and an eccentric gear 25 meshing with the gear 12 secured to the crankshaft 4 are secured to the shaft 23.

As shown in FIGS. 6 and 7, in the lower portion of the cylinder 3 an inlet port 26 is provided to introduce gas mixture to the lower chamber 8, an exhaust port 27 is provided to exhaust spent gas and scavenging passages 28 are provided to supply compressed gas mixture to combustion space.

Operation of the 2-cycle reciprocating engine shown in FIGS. 6 and 7 is as follows.

As piston 2 moves upwards, the inlet port 26 is opened to introduce gas mixture to the chamber 8 and at the same time gas mixture which has supplied to the combustion chamber is compressed by the piston 2. By combustion of the gas mixture ignited by the spark plug 9, the piston 2 is forced downwards, and spent gas is exhausted from the exhaust port 27. The downward movement of the piston 2 compresses the gas mixture in the chamber 8 and compressed gas mixture is supplied to the combustion chamber through scavenge passages 28. Thus, as to the operation, the 2-cycle reciprocating engine according to the invention is similar to known crankcase compression 2-cycle engine.

The thermal energy produced in the combustion chamber is transmitted through the piston 2 and the linearly reciprocating rod 1 to rotation of the crankshaft 4 having angular velocity $\omega$; the rotation is transmitted through the gear 12 of the crankshaft 4 to the meshing eccentric gear 25 having the same number of teeth with that in the gear 12 and having an amount of eccentricity $l$ to the rotating shaft 23. Rotation of the eccentric gear 25 is transmitted through the gear 24 on the same shaft 23 to the gear 18 secured to the output shaft 17, and the gear 18 and similar gear 19 on the output shaft 17 mesh with the gears 15 and 16 having the same number of teeth with that in the gear 24 and being secured to the eccentric collars 5 and 6 respectively. Thus, the eccentric collars 5 and 6 revolve on the axis O whose distance from the axis P of rotation of the crankshaft 4 is amount of eccentricity $l$, in the reverse direction of the crankshaft 4 at angular velocity $\omega$. Consequently, the crankshaft 4 rotates on the axis P through the gear 12 and revolves on the axis O through the gears 15 and 16, in the reverse direction and at the same angular velocity. As shown previously, point A on the longitudinal axis of the rod 1 and at the distance $2l$ from the axis O, performs linear reciprocating motion having stroke $4l$, so that the motion is transmitted to the output shaft 17 as rotating motion.

Balancing of the reciprocating engine is described. As shown in FIG. 6, to the crank arms 11 of the crankshaft 4 and to the eccentric collars 5 and 6, just in the reverse side of the crank pin 10 about the axis P of the crankshaft 4 about the axis O respectively so as to satisfy aforementioned condition $\alpha=\beta=0$, rotation balancing weight $m_1$ and revolution balancing weight $m_2$ are secured respectively. The balancing weights $m_1$ and $m_2$ are determined according to the invention to satisfy Formula 19, i.e., $ml=m_1R_1$ and $(m+m_1+m_3)l=m_2R_2$ and secured to the crank arms 11 and to the eccentric collars 5 and 6 as true weights $W_1$ and $W_2$ at distance $R_1$ and $R_2$ between the center of gravity and the axis respectively. Thus as described before, the reciprocating machine is perfectly balanced. In the formulae, $m$ is reciprocating weight, $m_3$ is rotating weight and $l$ is an amount of eccentricity. Also, as both balancing weights having total mass $m_1$ are secured to the same distance from the center of the rod 1 respectively, so that no couple is produced to the rod 1. Both balancing weights having total mass $m_2$ are also arranged in the same manner.

As a 2-cycle engine, the reciprocating machine shown in FIGS. 6 and 7 has advantages that, the engine is perfectly balanced, and the vibration amplitude characteristic is in an order of $3\mu$ at 5000 r.p.m. of crankshaft, which is about $\frac{1}{80}$ of ordinary engine, so that the engine is especially suitable for engines without rigid foundation, such as portable engines. Further, as the connecting rod 1 reciprocates linearly, lower space of the cylinder 3 can be sealed from crankcase space by the seal 7, so that the defined chamber 8 can be utilized as other compression chamber. The compression ratio of the chamber 8 can very easily be accommodated to any desired value, so that effective scavenging is attained.

FIGS. 8 and 9 show another embodiment of the present invention utilizing planetary motion transmitting mechanism. FIGS. 8 and 9 also show 2-cycle reciprorating engine for the sake of clarity and to simplify description. The same reference numerals are used to represent similar parts or portions. As shown in these figures, the linearly reciprocating rod 1 is connected to a crank pin 31. This crank pin 31 is secured or integral with crank arms 32 which are integral with shaft portions 33 and 34 of the crankshaft assembly 4'. As before, the shafts 33 and 34 are rotatably supported through suitable bearings such as needle bearings 35 and 35' provided in eccentric collars 36 and 37 which are supported through bearings 38 and 38' secured to a casing 39.

In this embodiment shown in FIGS. 8 and 9, planet gears 40 and 41 are secured to the shafts 33 and 34 respectively, and mesh with internal gears 42 and 43 respectively which are secured to the casing 39 and have twice the number of teeth with that in the planet gears 40 and 41 and pitch circle thereof coincide to center of the crank pin 31. Gears 44 and 45 are secured to the eccentric collars 36 and 37 and mesh with gears 46 and 47 shown in FIG. 9 which are secured to an output shaft 48. As before, the crankshaft assembly 4' provides abovementioned counterweight $m_1$ and the eccentric collars 36 and 37 provide counterweight $m_2$. These counterweights $m_1$ and $m_2$ are provided in the opposite side of the crank pin 31 about axis P and the needle bearing 35 about axis O at the distances $R_1$ and $R_2$ respectively, and also are determined to satisfy $\alpha=\beta=0$ and Formula 19.

Operation of the 2-cycle internal combustion engine shown in FIGS. 8 and 9 is utterly similar to the engine shown in FIGS. 6 and 7.

As piston 2 moves upwards, inlet port 26 is opened to introduce gas mixture to the chamber 8 and at the same time gas mixture which had supplied to the combustion chamber is compressed. By combustion of the gas mixture, the piston 2 is forced downwards and thermal energy produced in the combustion chamber is transmitted through the piston 2 and the linearly reciprocating rod 1 to rotation of the crankshaft assembly 4'. As the planet gears 40 and 41 supported by the crankshaft assembly 4' mesh with the internal gears 42 and 43 having twice the number of teeth with that in the gears 40 and 41, the center of the crank pin 31 which coincide to a point on the pitch circle of the internal gears 42 and 43 linearly reciprocates supporting the end of the rod 1. The eccentric collars 36 and 37 act as planet carriers of the planet gears 40 and 41 and rotate on the axis of the internal gears 42 and 43.

Thus, as above-mentioned mechanism, linear reciprocating motion of the rod 1 is performed, and the reciprocating motion is transmitted to the crank pin 31 as rotating motion of angular velocity $\omega$ on the center axis P of crankshaft assembly 4' as the planet gears 40 and 41 meshing with the fixed internal gears 42 and 43 rotate with the crank pin 31. At the same time, the planet carriers or the eccentric collars 36 and 37 rotate on the center axis O of the internal gears 42 and 43 and also of the collars 36 and 37. Consequently, the crankshaft assembly 4' rotates on the axis P and revolves on the axis O at the same angular velocity $\omega$ and in the reverse direction with each other. Thus, a simpler mechanism compared to the mechanism shown in FIGS. 6 and 7 is obtained to attain perfectly balanced rotation-reciprocation machine according to the invention.

Also in this case, the application of the device and the balancing theory is not limited to the shown 2-cycle reciprocating engine or other engines to drive the output shaft, the same device can be used to be driven by input shaft, such as compressors, riveters or other machines and mechanisms to attain reciprocating motion without vibration from rotating motive power source.

What is claimed is:

1. A perfectly balanced rotation-reciprocation device comprising a casing, a rod having working means at one end, a crankshaft having a crank pin rotatably supporting another end of the rod at an amount of eccentricity $l$, at least one eccentric collar means rotatably supported by the casing and having means rotatably supporting said crankshaft at the amount of eccentricity $l$, means to cooperate said crankshaft and said eccentric collar means to rotate said crankshaft and collar means at the same uniform angular velocity and in the reverse direction to each other and to effect linear reciprocating motion of the rod, balance weight means of mass $m_1$ secured to the crankshaft directly in the opposite side of the crank pin at distance $R_1$ from the center of crankshaft, another balance weight means of mass $m_2$ secured to the eccentric collar means directly in the opposite side of the supporting means at distance $R_2$ from its center, and said both balance weight means are determined to satisfy formulae $ml=m_1R_1$ and $(m+m_1+m_3)l=m_2R_2$, wherein $m$ being reciprocating mass, $m_3$ being rotating mass, so that unbalance forces caused by reciprocating mass are balanced.

2. A rotation-reciprocation device as claimed in claim 1 wherein said means to cooperate the crankshaft and the eccentric collar means comprising a first gear secured to the crankshaft, a first and a second shaft rotatably supported by the casing and being parallel to the axis of the crankshaft, an eccentric gear having the same number of teeth with that in the first gear and the amount of eccentricity $l$ and being secured to the first shaft and meshed with the first gear, second gear means secured to the first shaft, third gear means secured to the second shaft and meshing with the second gear means, and fourth gear means secured to at least one of said eccentric collar means and meshing with the third gear means and having the same number of teeth with that in the second gear means.

3. A rotation-reciprocation device as claimed in claim 1 wherein said means to cooperate the crankshaft and the eccentric collar means comprising planet gear means having pitch circle diameter $2l$ and being secured to the crankshaft, and internal gear means secured to the casing and being concentric to the eccentric collar means and meshing with the planet gear means and having pitch circle diameter $4l$.

4. A rotation-reciprocation device as defined in claim 1, wherein said working means connected to the rod being piston means, and the device further comprising cylinder means accommodating said piston means, said cylinder means having inlet, outlet and scavenging passage means and being connected to the casing, cylinder head means secured to the cylinder means defining a combustion chamber between said cylinder and piston means, a spark plug means secured to the cylinder head means, seal means secured to the casing and slidably engaging said rod to define a further space in the cylinder means between said piston and said casing, and said inlet means and one end of the scavenging passage means being communicated to said further space so that said further space is formed as pre-compression chamber of 2-cycle internal combustion engine.

References Cited
UNITED STATES PATENTS

| | | | |
|---|---|---|---|
| 1,871,899 | 8/1932 | Marshall | 74—604 |
| 3,112,658 | 12/1963 | Berlyn | 123—192 |
| 3,203,274 | 8/1965 | Barth et al. | 74—604 |
| 3,402,707 | 9/1968 | Heron | 74—603 |
| 3,447,512 | 6/1969 | Winkelmann et al. | 123—8 |
| 3,457,804 | 7/1969 | Harkness | 123—192 |
| 3,463,126 | 8/1969 | Pax | 123—8 |

WESLEY S. RATLIFF, JR., Primary Examiner

U.S. Cl. X.R.

123—192, 197